United States Patent
Tenner et al.

(10) Patent No.: US 11,983,561 B2
(45) Date of Patent: *May 14, 2024

(54) CONFIGURING HARDWARE MULTITHREADING IN CONTAINERS

(71) Applicant: International Business Machines Corporation, Armonk, NY (US)

(72) Inventors: Jeffrey W. Tenner, Rochester, MN (US); Joseph W. Cropper, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,725

(22) Filed: Dec. 21, 2022

(65) Prior Publication Data

US 2023/0118883 A1 Apr. 20, 2023

Related U.S. Application Data

(63) Continuation of application No. 17/077,369, filed on Oct. 22, 2020, now Pat. No. 11,567,796.

(51) Int. Cl.
G06F 9/48 (2006.01)
G06F 9/455 (2018.01)
G06F 9/50 (2006.01)

(52) U.S. Cl.
CPC ........ *G06F 9/4881* (2013.01); *G06F 9/45558* (2013.01); *G06F 9/5072* (2013.01); *G06F 9/5077* (2013.01); *G06F 2009/4557* (2013.01); *G06F 2209/5018* (2013.01)

(58) Field of Classification Search
CPC .. G06F 9/4881; G06F 9/45558; G06F 9/5072; G06F 9/5077; G06F 2009/4557; G06F 2209/5018

See application file for complete search history.

(56) References Cited

U.S. PATENT DOCUMENTS 9,692,788 B2 * 6/2017 Nagarajan ............. H04W 12/37
2015/0355931 A1 * 12/2015 Cropper .............. G06F 9/45558
718/1

OTHER PUBLICATIONS

List of all IBM related dockets, 2022.

* cited by examiner

*Primary Examiner* — Wissam Rashid
(74) *Attorney, Agent, or Firm* — Garg Law Firm, PLLC; Rakesh Garg; Nathan Rau

(57) ABSTRACT

As part of a container initialization procedure, a maximum number of hardware threads per processor core in a set of cores of a computer system are enabled, the container initialization procedure configuring an operating system executing on the computer system for container execution and configuring a first container for execution on the operating system. From a set of available cores in the set of cores, an execution core is selected. In the selected execution core, a number of threads per core to be used during execution of the first container is configured, the number of threads per core specified for the container initialization procedure by a first simultaneous multithreading (SMT) parameter. Using the configured execution core, the first container is executed, the executing virtualizing the operating system.

18 Claims, 12 Drawing Sheets

CONFIGURING HARDWARE MULTITHREADING IN CONTAINERS

BACKGROUND

The present invention relates generally to a method, system, and computer program product for configuring hardware multithreading. More particularly, the present invention relates to a method, system, and computer program product for configuring hardware multithreading in containers.

A virtual machine (VM) virtualizes, or emulates, a physical computer system. VMs are managed by a hypervisor, which performs resource virtualization and separates VMs from each other. Each virtual machine contains a guest operating system (OS), a virtual copy of the hardware that the OS requires to run, and at least one application, with associated libraries and dependencies, running on the guest OS.

A container is similar to a VM, but instead of virtualizing a physical computer system, a container virtualizes an operating system. The operating system can be running on a VM or on a physical computer. Multiple containers can run on the same machine and share the OS kernel with other containers, each running as isolated processes in user space. Each individual container contains only an application and its libraries and dependencies.

Because containers do not include their own OS, they are smaller than VMs and faster to deploy. In addition, because communication among containers requires less overhead than communication among VMs, containers also enable microservice architectures, in which application components are deployed and scaled instead of complete applications. As a result, application components within an application can be separated from each other, and if a single component is struggling with load, additional instances of the component can be deployed instead of the entire application.

Several different methods are available to specify one or more settings that govern a container's configuration and operation. One container implementation includes a command line interface (CLI) used to specify container settings. Another container implementation includes an application program interface (API) used by another program, such as an orchestration framework, to specify container settings. Container settings can also be specified within a container image, a self-contained static set of files including application component executables, system libraries, system tools, and platform settings that encapsulate a container including everything needed to execute the image as a container. Some container images apply to a particular platform or architecture. Other container images include a multi-platform or multi-architecture capability, and can include settings specific to each supported platform or architecture. Container settings and preferences can also be specified within a container registry, which stores one or more container images for deployment.

In computer system administration, orchestration is the automated configuration, coordination, and management of computer systems and software. Orchestration typically automates a process or workflow that involves many steps across multiple disparate systems. An orchestration framework is a software tool that performs orchestration. One function of an orchestration framework is to configure and provide containers, although a container can be configured and provided without using an orchestration framework. Kubernetes is a non-limiting example of an orchestration framework; other orchestration frameworks are also presently available. (Kubernetes is a registered trademark of the Linux Foundation in the United States and other countries.)

Hardware multithreading is the ability of a computer processor, or a single processor core within a multi-core processor, to execute multiple execution threads of an application or application component concurrently.

SUMMARY

The illustrative embodiments provide a method, system, and computer program product. An embodiment includes a method that enables, as part of a container initialization procedure, a maximum number of hardware threads per processor core (core) in a set of cores of a computer system, the container initialization procedure configuring an operating system executing on the computer system for container execution and configuring a first container for execution on the operating system. An embodiment selects, from a set of available cores in the set of cores, an execution core. An embodiment configures, in the selected execution core, a number of threads per core to be used during execution of the first container, the number of threads per core specified for the container initialization procedure by a first simultaneous multithreading (SMT) parameter. An embodiment executes, using the configured execution core, the first container, the executing virtualizing the operating system.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
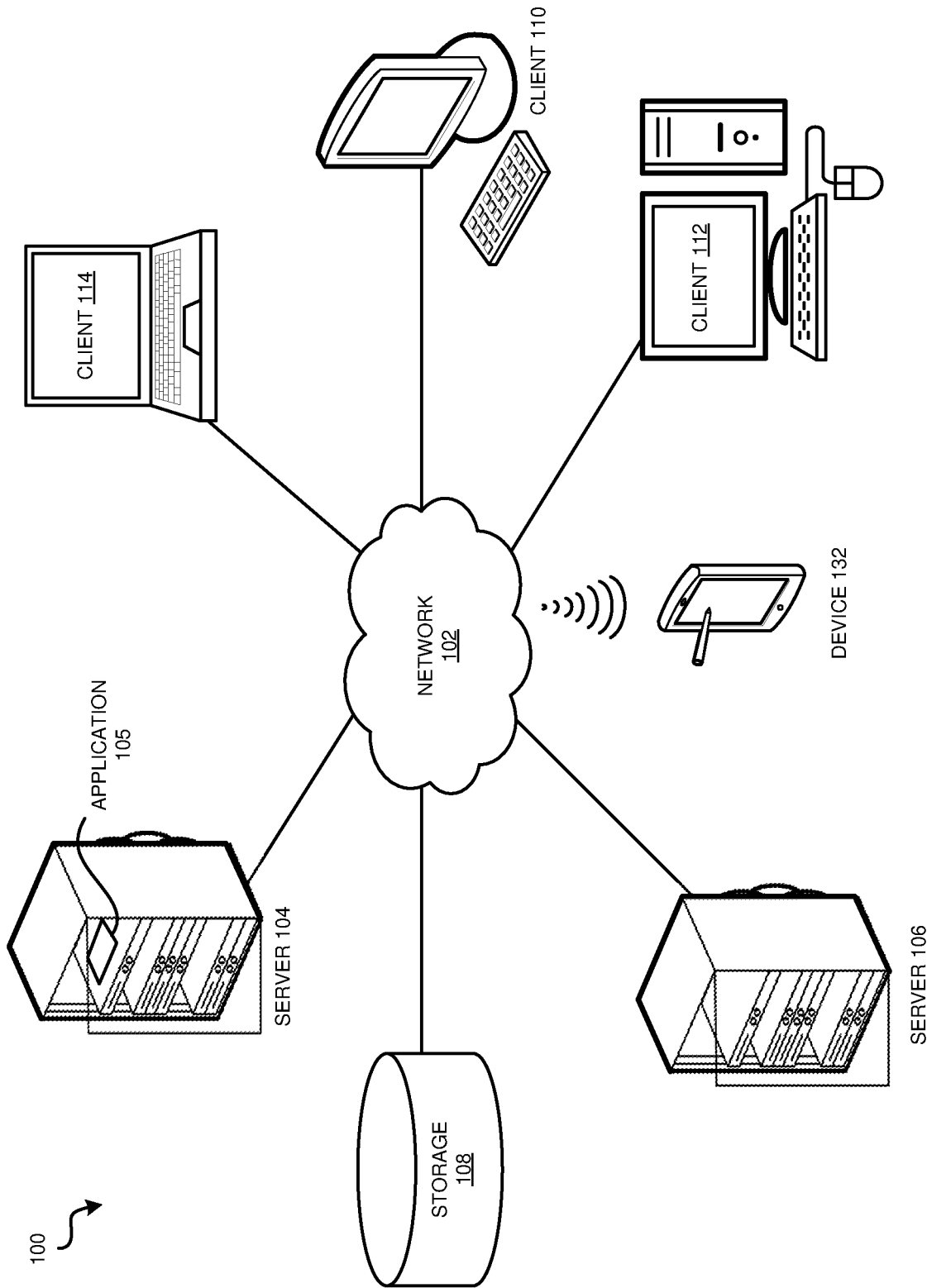
FIG. 1 depicts a block diagram of a network of data processing systems in which illustrative embodiments may be implemented.

The illustrative embodiments recognize that not all processing workloads benefit from execution using multithreading. In addition, different processing workloads benefit from execution using different numbers of threads. Some workloads are latency-sensitive, with a strict requirement for average or worst-case response time of a transaction. For example, workloads such as voice over IP (VoIP) and streaming video, are latency-sensitive because they process data in real time. If multiple threads are competing for the same resources, such as caches, system memory, and network resources, increased wait time for resources increases latency as well. As a result, latency-sensitive workloads often benefit from executing using only one or two threads, even if additional threads are available. Other workloads (e.g. a database workload) process as much data as possible, but often give up processing time while waiting for input/output or other blocking operations, and thus often benefit from executing with as many threads as possible. When processing workloads are implemented as applications within VMs, the applications have thread usage settings configured within a guest OS, allowing adjustment of thread usage to meet specific applications' requirements.

The illustrative embodiments also recognize that unlike VMs, containers inherit their thread usage configuration from the operating system being virtualized. Thus, all containers running in a VM, or on a physical server without VMs, have the same thread usage setting. However, when all containers use the same thread usage setting, that setting is unlikely to provide performance appropriate to a particular workload's requirements. For example, an application might include two components, one performing database operations (and thus requiring execution with as much parallelism as possible, to maximize throughput) and another processing real-time video (and thus executing using only one or two threads, to minimize latency). Setting thread usage to as many threads as possible might create too much latency for the image processing container, executing single-threaded slows the database operations container unnecessarily, and a compromise setting might create unacceptable performance for both containers. Thus, the illustrative embodiments realize that there is a need to adjust the number of threads used in container execution on a per-container basis.

The illustrative embodiments recognize that the presently available tools or solutions do not address these needs or provide adequate solutions for these needs. The illustrative embodiments used to describe the invention generally address and solve the above-described problems and other problems related to configuring hardware multithreading in containers.

An embodiment can be implemented as a software application. The application implementing an embodiment can be configured as a modification of an existing container configuration system, as a separate application that operates in conjunction with an existing container configuration system, a standalone application, or some combination thereof.

Particularly, some illustrative embodiments provide a method that, as part of an operating system initialization as a host of containers and a container initialization procedure, enables a maximum number of hardware threads per processor core, selects one or more execution cores, configures a number of threads per core in the execution cores, and uses the configured execution cores to execute the container being initialized.

A container initialization procedure prepares an operating system to execute containers and prepares a container for execution virtualizing an operating system. As part of a container initialization procedure, an embodiment receives a set of container execution parameters. Container execution parameters specified within a container image represent an application developer's understanding of an application component intended for execution in a container and the optimal execution settings for that particular application component.

In one embodiment, the set of container execution parameters includes a simultaneous multithreading (SMT) parameter specifying how many threads per core are to be used to execute the container. For example, a container executing at SMT1 uses cores with only one thread enabled in each core. As another example, a container executing at SMT8 uses cores with eight threads enabled in each core. In another embodiment, the set of container execution parameters includes a container core parameter specifying a number of cores to be used to execute the container being initialized. In another embodiment, the set of container execution parameters includes a parameter specifying a number of total threads to be used to execute the container being initialized, and the embodiment determines the container core parameter from the SMT parameter and the number of total threads. In another embodiment, the set of container execution parameters includes a shareability parameter specifying whether or not the threads to be used to execute the container are sharable with another container. In another embodiment, the set of container execution parameters includes other or additional parameters.

In embodiments, container execution parameters are specified via a CPI or API, or within metadata associated with a container image. A container image that applies to a particular platform or architecture includes one set of container execution parameters appropriate to the platform or architecture. A container image with a multi-platform or multi-architecture capability often includes multiple sets of container execution parameters, each configuring a container for execution on a different supported platform or architecture. Another embodiment receives a set of preferences from a container registry or another source and determines a corresponding set of container execution parameters. In one embodiment, the set of preferences is actually a set of requirements, i.e. settings that a container must implement. A non-limiting example of a set of requirements is that the container execute with the maximum possible number of threads per core, without specifying a particular number of threads per core. Because different architectures can have different numbers of threads per core, structuring a requirement in this manner avoids a need to specify specific numbers of threads per core for each different processor architecture. In another embodiment, the set of preferences is not a hard set of requirements, but instead comprises settings that a container should do its best to implement. A non-limiting example of a set of preferences is that the container execute with one exclusive thread per core if possible, but if exclusivity is unavailable one shareable thread per core is acceptable. In one embodiment, the determined set of container execution parameters overrides parameters specified in a container image.

As part of a container initialization procedure, an embodiment prepares an operating system for use with containers by enabling the maximum number of hardware threads per processor core in a computer system on which the container is to execute. This enabling overrides any default, previous, or inherited thread setting. An embodiment performs the enabling using any presently-available technique. For example, the SMTCTL command in the AIX operating system and the ppc64_cpu command in the Linux operating system on IBM Power systems might be used to perform the enabling. (AIX and IBM are registered trademarks of International Business Machines Corporation in the United States and other countries. Linux is a registered trademark of Linus Torvalds in the United States and other countries.)

An embodiment determines which processor cores are available to execute a container being initialized, using any presently-available technique. For example, the virsh vcpu-pin command provided by the RedHat Linux operating system provides core availability data. (RedHat is a registered trademark of Red Hat, Inc. in the United States and other countries.) From the available cores, an embodiment selects the number of cores specified by the container core parameter. The container, once initialized, will execute on the selected cores.

An embodiment configures the selected cores to execute using the number of threads per core specified by the SMT parameter. Because the maximum number of hardware threads per processor core were previously enabled, to perform the configuring an embodiment disables as many threads as are necessary to obtain the number of threads per core specified by the SMT parameter. For example, consider a processor with eight threads per core. To execute a container at SMT8, all eight threads are already enabled, so an embodiment does not disable any threads in each core to be used. To execute a container at SMT4, an embodiment disables four threads in each core to be used. To execute a container at SMT1, an embodiment disables seven threads in each core to be used.

An embodiment configures the selected cores to execute according to the shareability parameter. If no shareability parameter was specified, an embodiment applies a default setting, either shareable or exclusive. If the selected cores are configured for exclusive use, an embodiment executes the container using the selected, configured cores, and does not permit other containers to use the cores while the first container is executing. If the selected cores are configured for shareable use, an embodiment executes the container using the selected, configured cores. The embodiment also allows a second container, with an SMT parameter equal to that of the first container, to execute using the selected cores and the threads within those cores. Note that both containers sharing the cores use only the enabled threads, and the disabled threads remain disabled for both containers.

The manner of configuring hardware multithreading in containers described herein is unavailable in the presently available methods in the technological field of endeavor pertaining to container configuration and execution. A method of an embodiment described herein, when implemented to execute on a device or data processing system, comprises substantial advancement of the functionality of that device or data processing system in, as part of a container initialization procedure, enabling a maximum number of hardware threads per processor core, selecting one or more execution cores, configuring a number of threads per core in the execution cores, and using the configured execution cores to execute the container being initialized.

The illustrative embodiments are described with respect to certain types of processors, cores, threads, containers, parameters, preferences, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
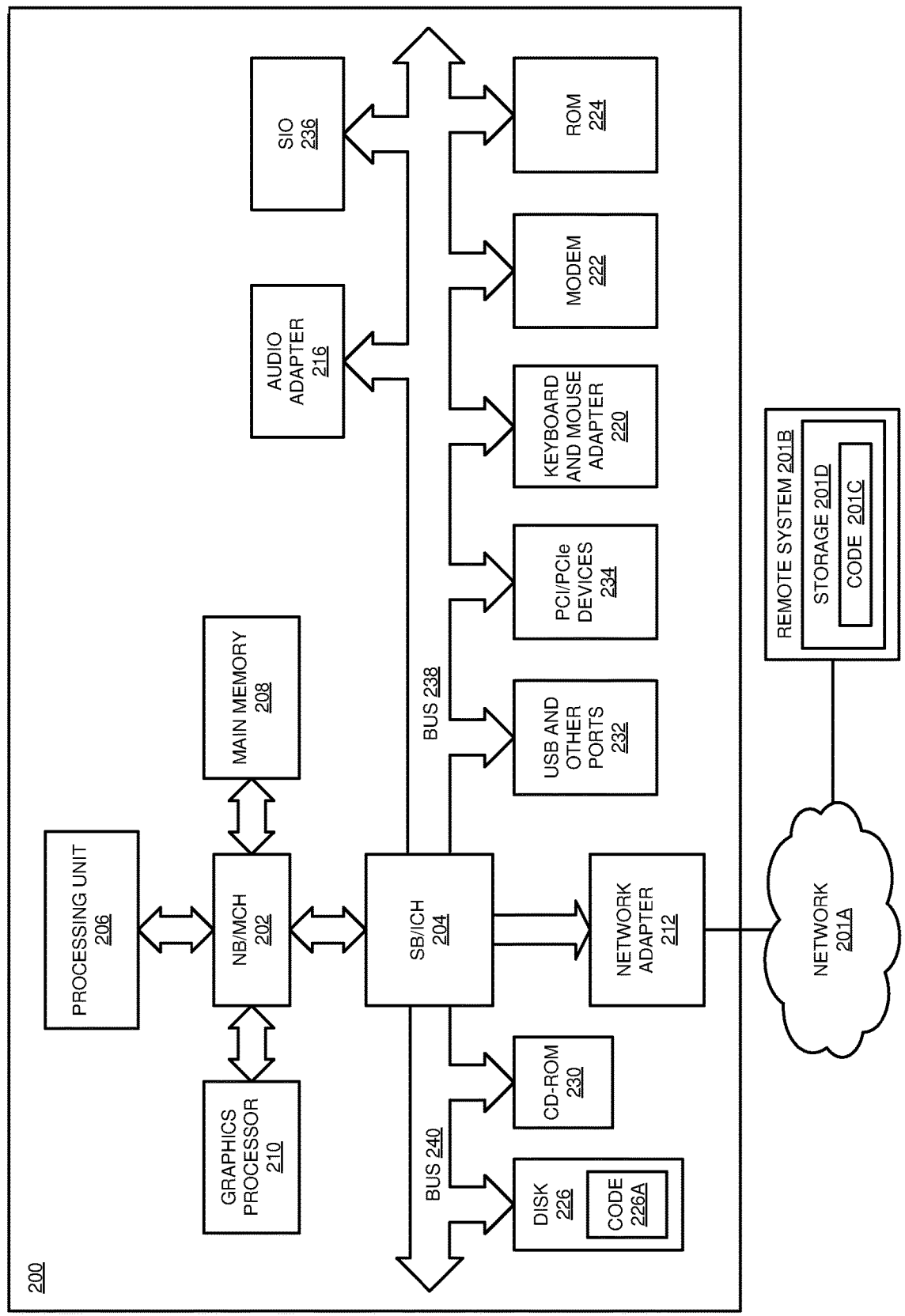
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
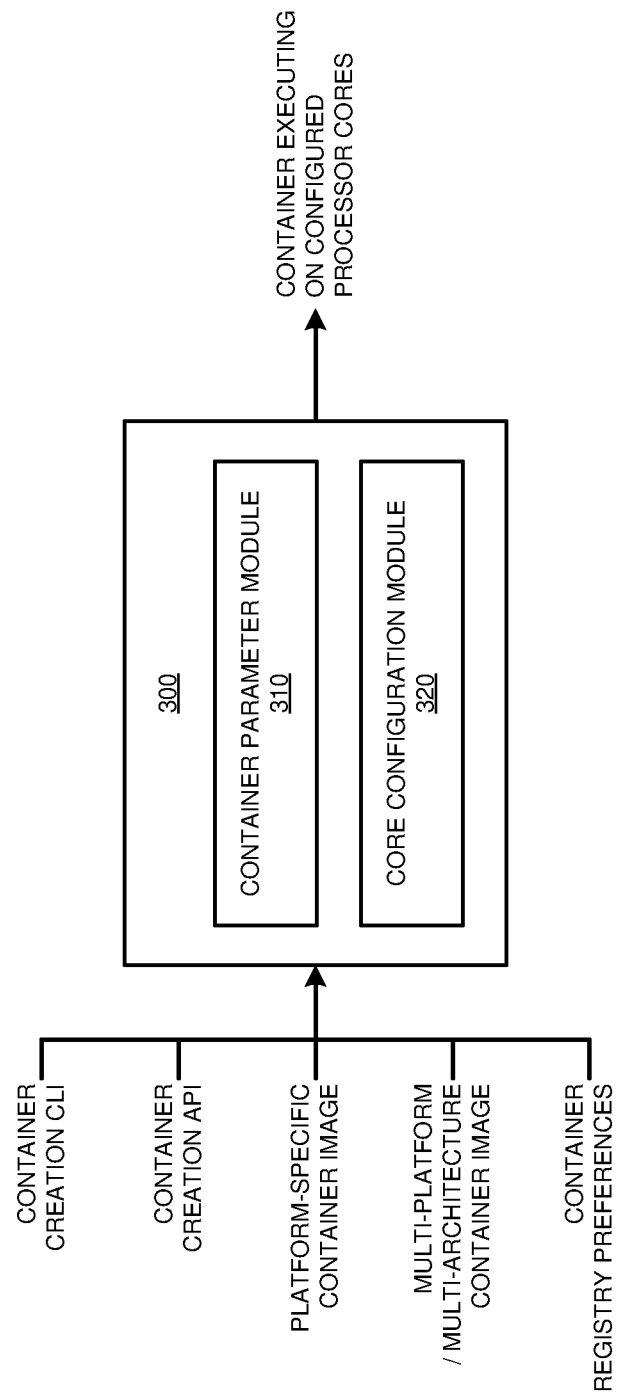
FIG. 3 depicts a block diagram of an example configuration for configuring hardware multithreading in containers in accordance with an illustrative embodiment.

With reference to FIG. 3, this figure depicts a block diagram of an example configuration for configuring hardware multithreading in containers in accordance with an illustrative embodiment. Application 300 is an example of application 105 in FIG. 1 and executes in any of servers 104 and 106, clients 110, 112, and 114, and device 132 in FIG. 1.

As part of a container initialization procedure, container parameter module 310 receives a set of container execution parameters. In one implementation of module 310, the set of container execution parameters includes an SMT parameter specifying how many threads per core are to be used to execute the container. In another implementation of module 310, the set of container execution parameters includes a container core parameter specifying a number of cores to be used to execute the container being initialized. In another implementation of module 310, the set of container execution parameters includes a parameter specifying a number of total threads to be used to execute the container being initialized, and module 310 determines the container core parameter from the SMT parameter and the number of total threads. In another implementation of module 310, the set of container execution parameters includes a shareability parameter specifying whether or not the threads to be used to execute the container are sharable with another container. In another implementation of module 310, the set of container execution parameters includes other or additional parameters.

In implementations of module 310, container execution parameters are specified via a CPI or API, or within a container image. Another implementation of module 310 receives a set of preferences from a container registry or another source and determines a corresponding set of container execution parameters. In one implementation of module 310, the set of preferences is actually a set of requirements, i.e. settings that a container must implement. In another implementation of module 310, the set of preferences is not a hard set of requirements, but instead comprises settings that a container should do its best to implement. In one implementation of module 310, the determined set of container execution parameters overrides parameters specified in a container image.

As part of a container initialization procedure, an embodiment prepares an operating system for use with containers by enabling the maximum number of hardware threads per processor core in a computer system on which the container is to execute. This enabling overrides any default or previous thread setting or any thread setting that may have been inherited from a VM.

Module 320 determines which processor cores are available to execute a container being initialized. From the available cores, module 320 selects the number of cores specified by the container core parameter. The container, once initialized, will execute on the selected cores.

Module 320 configures the selected cores to execute using the number of threads per core specified by the SMT parameter. Because the maximum number of hardware threads per processor core were previously enabled, to perform the configuring module 320 disables as many threads as are necessary to obtain the number of threads per core specified by the SMT parameter.

Module 320 configures the selected cores to execute according to the shareability parameter. If no shareability parameter was specified, module 320 applies a default setting, either shareable or exclusive. If the selected cores are configured for exclusive use, module 320 executes the container using the selected, configured cores, and does not permit other containers to use the cores while the first container is executing. If the selected cores are configured for shareable use, module 320 executes the container using the selected, configured cores and allows a second container, with an SMT parameter equal to that of the first container, to execute using the selected cores and the threads within those cores. Note that both containers sharing the cores use only the enabled threads, and the disabled threads remain disabled for both containers.

Figure 4:
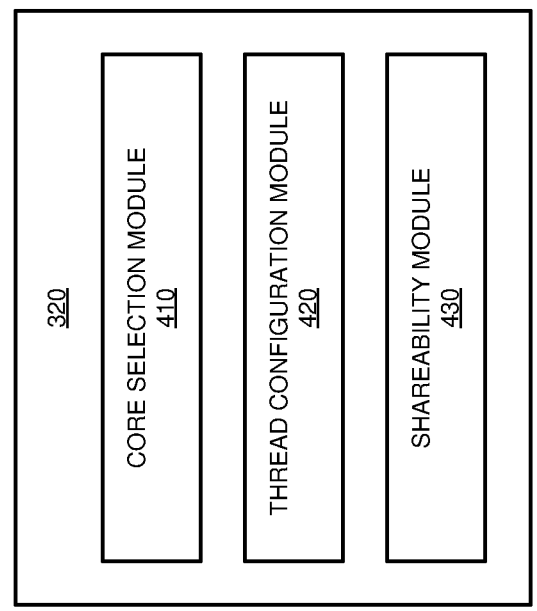
FIG. 4 depicts a block diagram of an example configuration for configuring hardware multithreading in containers in accordance with an illustrative embodiment.

With reference to FIG. 4, this figure depicts a block diagram of an example configuration for configuring hardware multithreading in containers in accordance with an illustrative embodiment. FIG. 4 provides more detail of module 320 in FIG. 3.

As part of a container initialization procedure, core selection module 410 enables the maximum number of hardware threads per processor core in a computer system on which the container is to execute. This enabling overrides any default or previous thread setting or any thread setting that may have been inherited from a VM.

Thread configuration module 420 determines which processor cores are available to execute a container being initialized. From the available cores, module 420 selects the number of cores specified by the container core parameter. The container, once initialized, will execute on the selected cores. Module 420 configures the selected cores to execute using the number of threads per core specified by the SMT parameter, disabling as many threads as are necessary to obtain the number of threads per core specified by the SMT parameter.

Shareability module 430 configures the selected cores to execute according to the shareability parameter. If no shareability parameter was specified, module 430 applies a default setting, either shareable or exclusive. If the selected cores are configured for exclusive use, module 430 executes the container using the selected, configured cores, and does not permit other containers to use the cores while the first container is executing. If the selected cores are configured for shareable use, module 430 executes the container using the selected, configured cores and allows a second container, with an SMT parameter equal to that of the first container, to execute using the selected cores and the threads within those cores.

Figure 5:
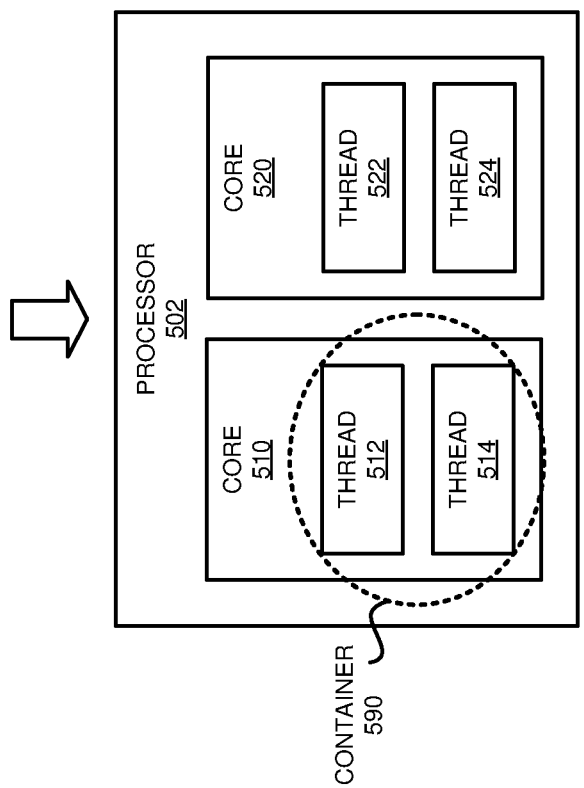
FIG. 5 depicts an example of configuring hardware multithreading in containers in accordance with an illustrative embodiment.

With reference to FIG. 5, this figure depicts an example of configuring hardware multithreading in containers in accordance with an illustrative embodiment. The example can be executed using application 300 in FIG. 3.

As depicted, processor 502 includes cores 510 and 520. Processor 502 has an architecture with two threads per core. Core 510 includes threads 512 and 514. Core 520 includes threads 522 and 524. Application 300 enables the maximum number of hardware threads per processor core—here, threads 512, 514, 522, and 524.

Application 300 receives parameters 580, specifying that container 590, being initialized, is to use one core, two threads per core, exclusively. Thus application 300 determines that core 510 is available and selects core 510. Application 300 configures core 510 to execute using the number of threads per core specified by the SMT parameter within parameters 580—here, two. Because two hardware threads per processor core were previously enabled, no threads are disabled. As a result, container 590 executes using threads 512 and 514 on core 510, and no other container can share core 510.

Figure 6:
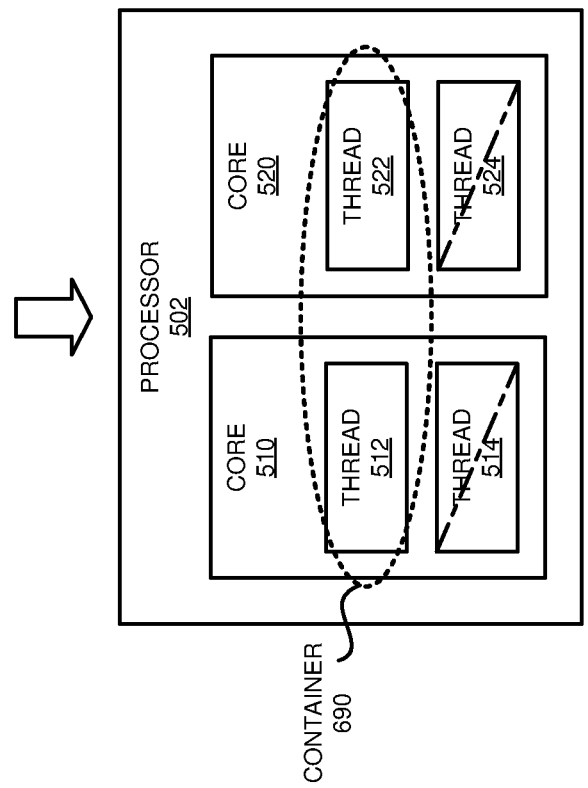
FIG. 6 depicts a continued example of configuring hardware multithreading in containers in accordance with an illustrative embodiment.

With reference to FIG. 6, this figure depicts a continued example of configuring hardware multithreading in containers in accordance with an illustrative embodiment. Processor 502, cores 510 and 520, and threads 512, 514, 522, and 524 are the same as processor 502, cores 510 and 520, and threads 512, 514, 522, and 524 in FIG. 5.

Application 300 enables the maximum number of hardware threads per processor core—here, threads 512, 514, 522, and 524. Application 300 receives parameters 680, specifying that container 690, being initialized, is to use two cores, one thread per core, exclusively. Thus application 300 determines that cores 510 and 520 are available and selects both. Application 300 configures cores 510 and 520 to execute using the number of threads per core specified by the SMT parameter within parameters 680—here, one. Because two hardware threads per processor core were previously enabled, application 300 disables one thread per core. As a result, container 690 executes using thread 512 on core 510 and thread 522 on core 510. Threads 514 and 524 are disabled. No other container can share cores 510 and 520.

Figure 7:
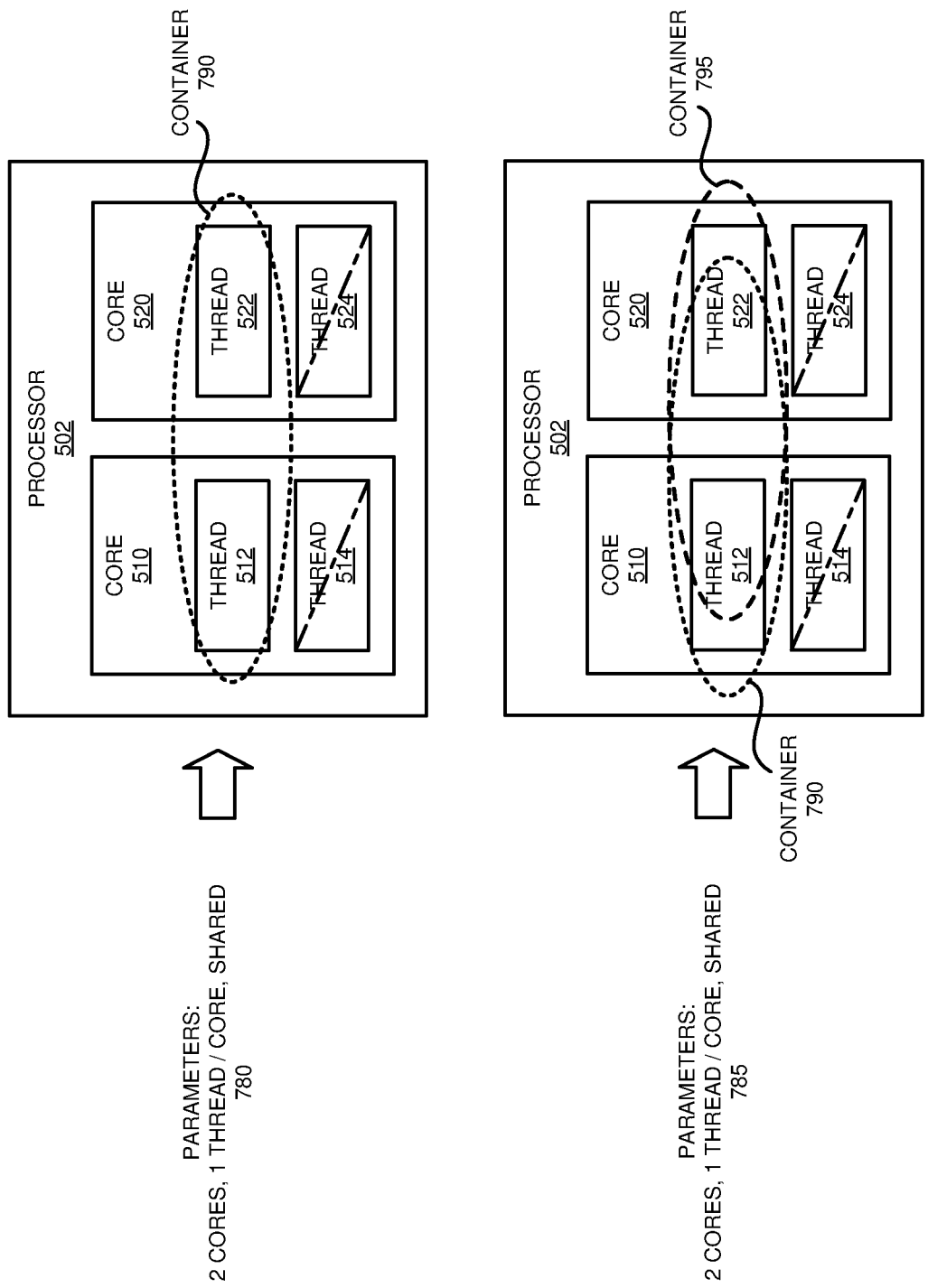
FIG. 7 depicts a continued example of configuring hardware multithreading in containers in accordance with an illustrative embodiment.

With reference to FIG. 7, this figure depicts a continued example of configuring hardware multithreading in containers in accordance with an illustrative embodiment. Processor 502, cores 510 and 520, and threads 512, 514, 522, and 524 are the same as processor 502, cores 510 and 520, and threads 512, 514, 522, and 524 in FIG. 5.

Application 300 enables the maximum number of hardware threads per processor core—here, threads 512, 514, 522, and 524. Application 300 receives parameters 780, specifying that container 790, being initialized, is to use two cores, one thread per core, shared. Thus application 300 determines that cores 510 and 520 are available and selects both. Application 300 configures cores 510 and 520 to execute using the number of threads per core specified by the SMT parameter within parameters 780—here, one. Because two hardware threads per processor core were previously enabled, application 300 disables one thread per core. As a result, container 790 executes using thread 512 on core 510 and thread 522 on core 520. Threads 514 and 524 are disabled.

Application 300 also receives parameters 785, specifying that container 795, being initialized, is to use two cores, one thread per core, shared. Container 790 is already configured to execute using thread 512 on core 510 and thread 522 on core 520, and cores 510 and 520 are shareable. Thus, application 300 configures container 795 to share thread 512 on core 510 and thread 522 on core 520. Threads 514 and 524 remain disabled and are not shared.

Figure 8:
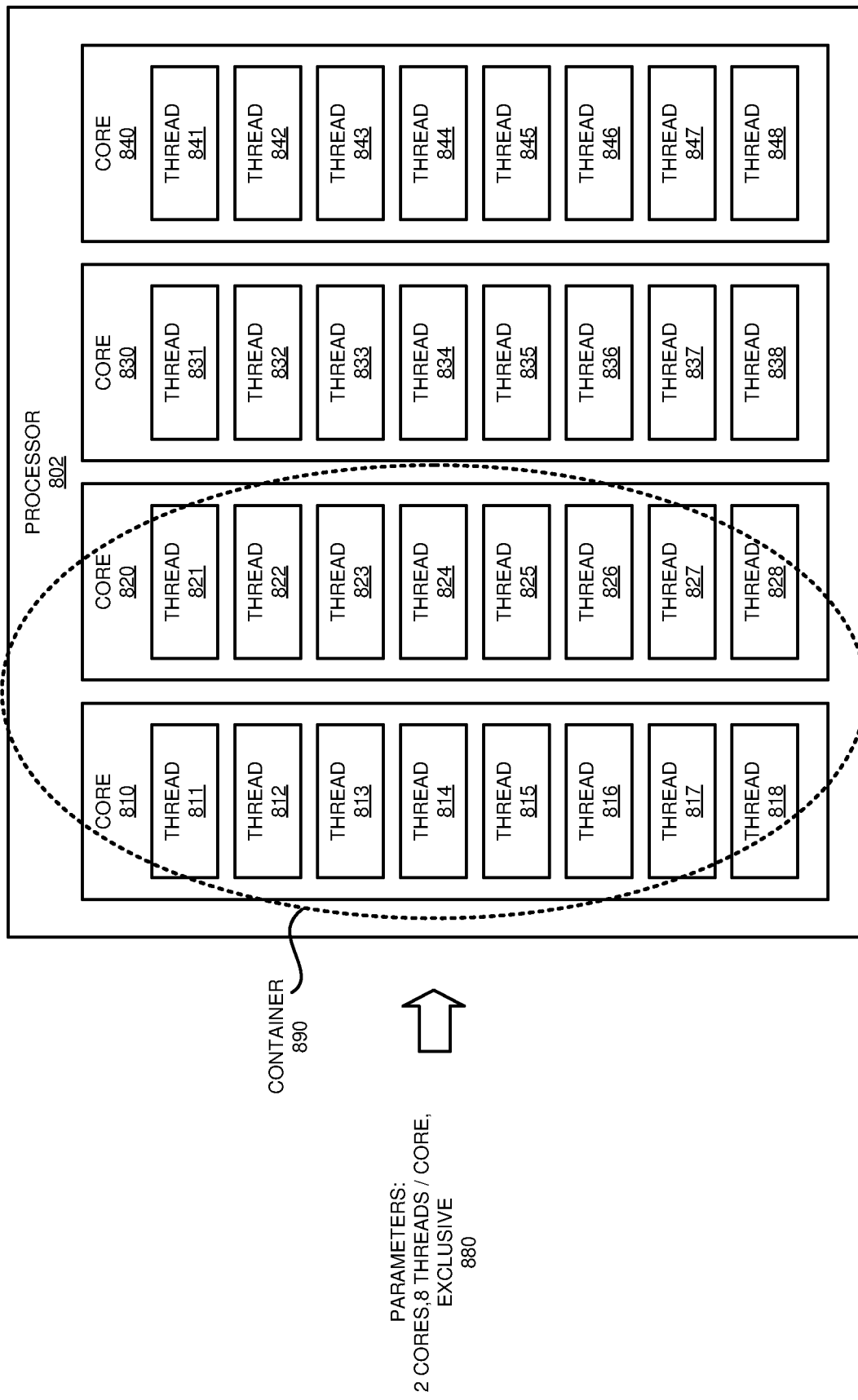
FIG. 8 depicts an example of configuring hardware multithreading in containers in accordance with an illustrative embodiment.

With reference to FIG. 8, this figure depicts an example of configuring hardware multithreading in containers in accordance with an illustrative embodiment. The example can be executed using application 300 in FIG. 3.

As depicted, processor 802 includes cores 810, 820, 830, and 840. Processor 802 has an architecture with eight threads per core. Core 810 includes threads 811-818, core 820 includes threads 821-828, core 830 includes threads 831-838, and core 840 includes threads 841-848. Application 300 enables the maximum number of hardware threads per processor core—here, threads 811-818, 821-828, 831-838, and 841-848.

Application 300 receives parameters 880, specifying that container 890, being initialized, is to use two cores, eight threads per core, exclusively. Thus application 300 determines that cores 810 and 820 are available and selects them. Application 300 configures cores 810 and 820 to execute using the number of threads per core specified by the SMT parameter within parameters 880—here, eight. Because eight hardware threads per processor core were previously enabled, no threads are disabled. As a result, container 890 executes using threads 811-818 on core 810 and threads 821-828 on core 810, and no other container can share cores 810 and 820.

Figure 9:
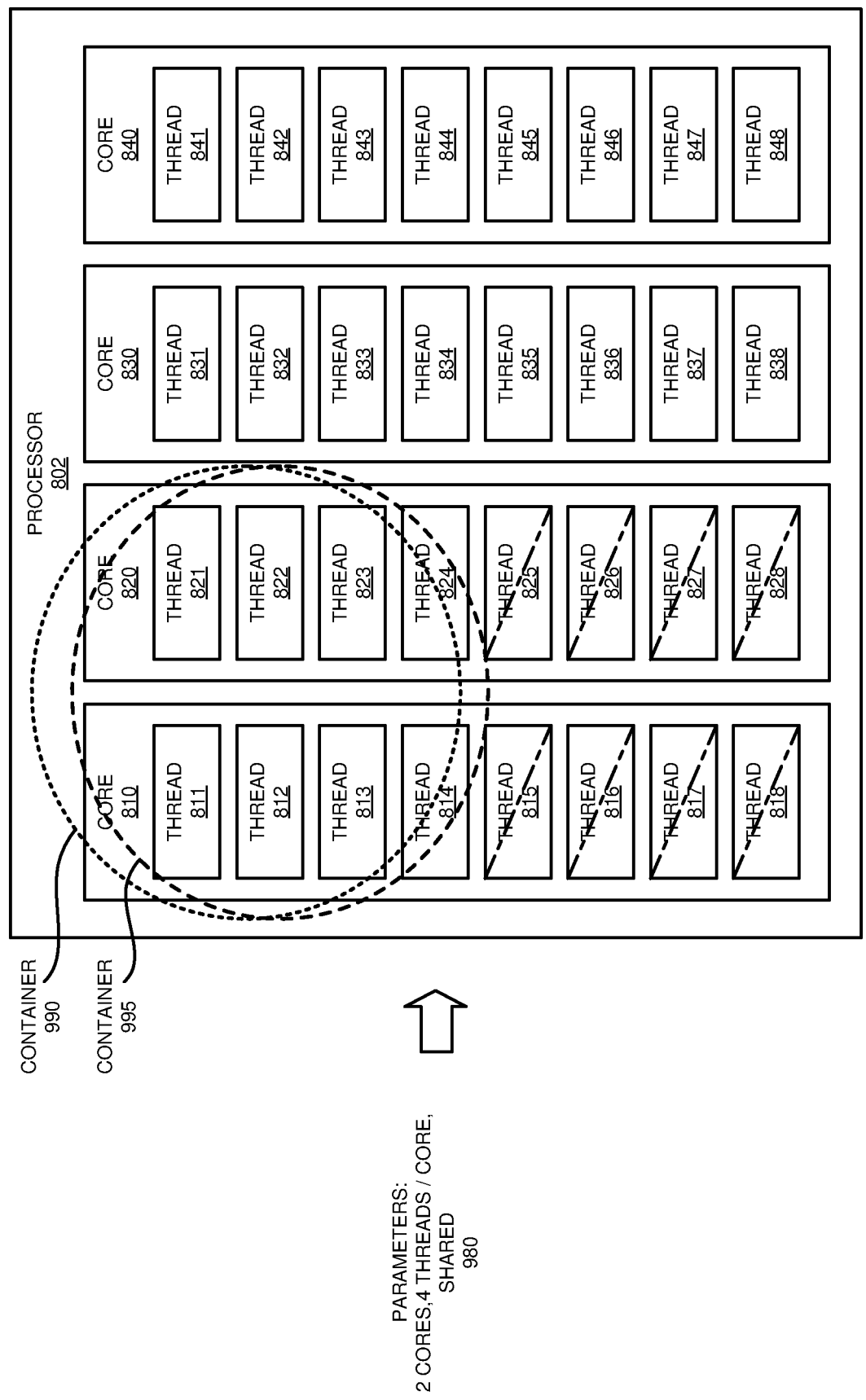
FIG. 9 depicts a continued example of configuring hardware multithreading in containers in accordance with an illustrative embodiment.

With reference to FIG. 9, this figure depicts a continued example of configuring hardware multithreading in containers in accordance with an illustrative embodiment. Processor 802, cores 810, 820, 830, and 840, and threads 811-818, 821-828, 831-838, and 841-848 are the same as processor 802, cores 810, 820, 830, and 840, and threads 811-818, 821-828, 831-838, and 841-848 in FIG. 5.

Application 300 enables the maximum number of hardware threads per processor core—here, threads 811-818, 821-828, 831-838, and 841-848. Application 300 receives parameters 980, specifying that container 990, being initialized, is to use two cores, four threads per core, shared. Thus application 300 determines that cores 810 and 820 are available and selects both. Application 300 configures cores 810 and 820 to execute using the number of threads per core specified by the SMT parameter within parameters 980—here, four. Because eight hardware threads per processor core were previously enabled, application 300 disables four threads per core. As a result, container 990 executes using threads 811-814 on core 810 and threads 821-824 on core 820. Threads 815-818 and 825-828 are disabled.

Application 300 also receives additional parameters (not shown), specifying that container 995, being initialized, is to use two cores, four threads per core, shared. Container 990 is already configured to execute using threads 811-814 on core 810 and threads 821-824 on core 820, and cores 810 and 820 are shareable. Thus, application 300 configures container 995 to share threads 811-814 on core 810 and threads 821-824 on core 820. Threads 815-818 and 825-828 remain disabled and are not shared.

Figure 10:
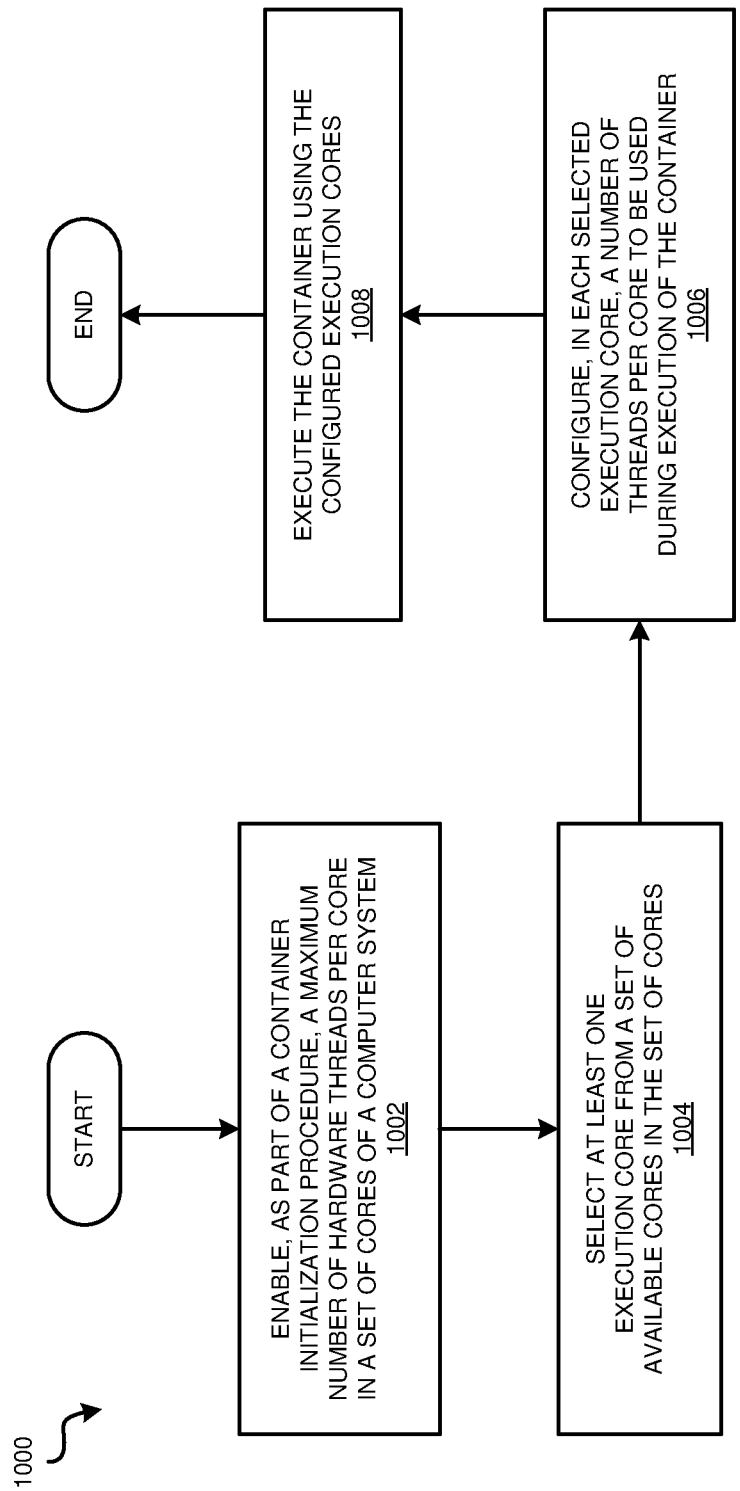
FIG. 10 depicts a flowchart of an example process for configuring hardware multithreading in containers in accordance with an illustrative embodiment.

With reference to FIG. 10, this figure depicts a flowchart of an example process for configuring hardware multithreading in containers in accordance with an illustrative embodiment. Process 1000 can be implemented in application 300 in FIG. 3.

In block 1002, the application enables, as part of a container initialization procedure, a maximum number of hardware threads per core in a set of cores of a computer system. In block 1004, the application selects at least one execution core from a set of available cores in the set of cores. In block 1006, the application configures, in each selected execution core, a number of threads per core to be used during execution of the container. In block 1008, the application executes the container using the configured execution cores. Then the application ends.

Figure 11:
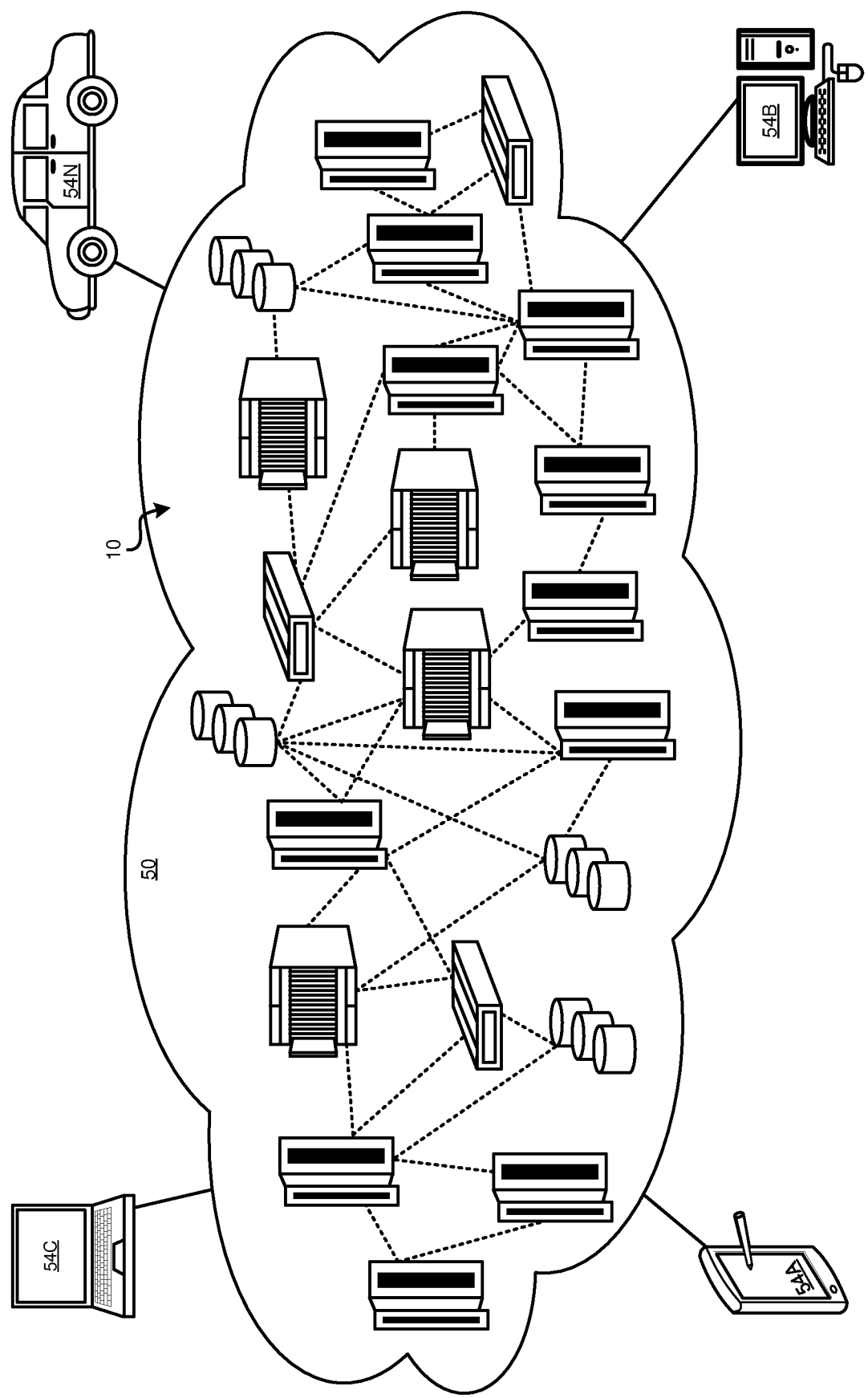
FIG. 11 depicts a cloud computing environment according to an embodiment of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 12:
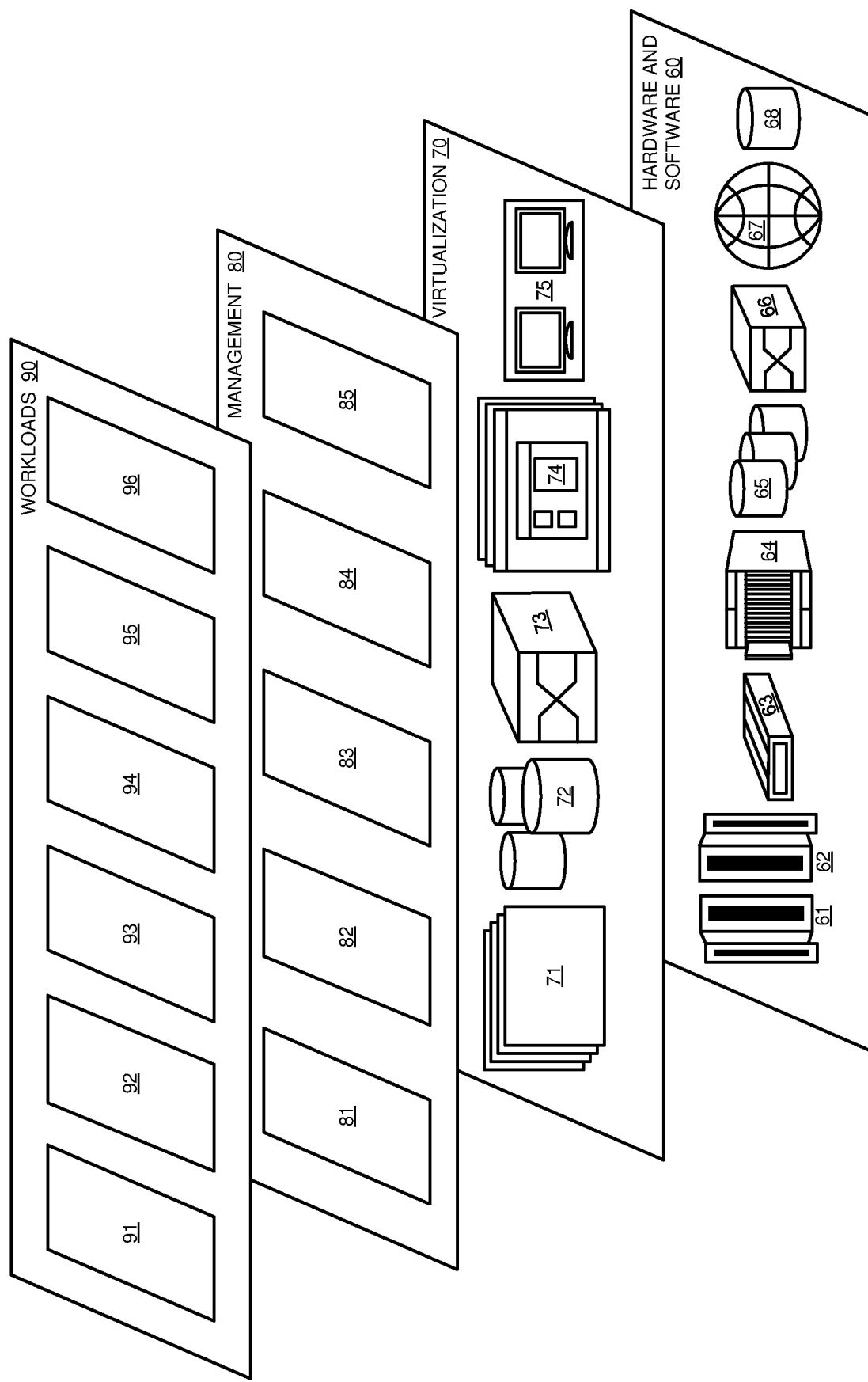
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for configuring hardware multithreading in containers and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
enabling, as part of a container initialization procedure, a maximum number of hardware threads per processor core (core) in a set of cores of a computer system;
configuring, in an execution core from the set of cores, a number of threads per core to be used during execution of a first container;
executing, using the execution core, the first container, the executing virtualizing an operating system executing on the computer system;
determining a first simultaneous multithreading (SMT) parameter, wherein the first SMT parameter specifies the number of threads per core for the container initialization procedure;
configuring, as sharable, the execution core, to form a sharable execution core; and
executing, using the sharable execution core, a second container, the second container having a second SMT parameter equal to the first SMT parameter.

2. The computer-implemented method of claim 1, further comprising:
determining, from a container preference setting, the first SMT parameter.

3. The computer-implemented method of claim 1, wherein the configuring comprises disabling, to achieve the number of threads per core, a thread in the execution core.

4. The computer-implemented method of claim 1, wherein a first container core parameter specifies a number of execution cores to be selected from the set of available cores.

5. The computer-implemented method of claim 1, further comprising:
enabling, as part of a second container initialization procedure, a second maximum number of hardware threads per processor core (core) in a second set of cores of the computer system;
configuring, in a second execution core from the second set of cores, a second number of threads per core to be used during execution of a third container, the third container having a third SMT parameter, wherein the third SMT parameter specifies the number of threads per core for the second container initialization procedure;
executing, using the second execution core, the third container, the executing virtualizing the operating system;
configuring, as exclusive, the second execution core, to form an exclusive execution core; and
preventing executing, using the exclusive execution core, a fourth container, the fourth container having a fourth SMT parameter equal to the third SMT parameter.

6. A computer program product for configuring hardware multithreading in containers, the computer program product comprising:
one or more computer readable storage media, and program instructions collectively stored on the one or more computer readable storage media, the program instructions when executed by a processor causing operations, the operations comprising:
enabling, as part of a container initialization procedure, a maximum number of hardware threads per processor core (core) in a set of cores of a computer system;
configuring, in an execution core from the set of cores, a number of threads per core to be used during execution of a first container;
executing, using the execution core, the first container, the executing virtualizing an operating system executing on the computer system;
determining a first simultaneous multithreading (SMT) parameter, wherein the first SMT parameter specifies the number of threads per core for the container initialization procedure;
configuring, as sharable, the execution core, to form a sharable execution core; and
executing, using the sharable execution core, a second container, the second container having a second SMT parameter equal to the first SMT parameter.

7. The computer program product of claim 6, the operations further comprising:
determining, from a container preference setting, the first SMT parameter.

8. The computer program product of claim 6, wherein the configuring comprises disabling, to achieve the number of threads per core, a thread in the execution core.

9. The computer program product of claim 6, wherein a first container core parameter specifies a number of execution cores to be selected from the set of available cores.

10. The computer program product of claim 6, the operations further comprising:
enabling, as part of a second container initialization procedure, a second maximum number of hardware threads per processor core (core) in a second set of cores of the computer system;
configuring, in a second execution core from the second set of cores, a second number of threads per core to be used during execution of a third container, the third container having a third SMT parameter, wherein the third SMT parameter specifies the number of threads per core for the second container initialization procedure;
executing, using the second execution core, the third container, the executing virtualizing the operating system;
configuring, as exclusive, the second execution core, to form an exclusive execution core; and
preventing executing, using the exclusive execution core, a fourth container, the fourth container having a fourth SMT parameter equal to the third SMT parameter.

11. The computer program product of claim 6, wherein the stored program instructions are stored in the at least one of the one or more storage media of a local data processing system, and wherein the stored program instructions are transferred over a network from a remote data processing system.

12. The computer program product of claim 6, wherein the stored program instructions are stored in the at least one of the one or more storage media of a server data processing system, and wherein the stored program instructions are downloaded over a network to a remote data processing system for use in a computer readable storage device associated with the remote data processing system.

13. The computer program product of claim 6, wherein the computer program product is provided as a service in a cloud environment.

14. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
- program instructions to enable, as part of a container initialization procedure, a maximum number of hardware threads per processor core (core) in a set of cores of a computer system;
- program instructions to configure, in an execution core from the set of cores, a number of threads per core to be used during execution of a first container;
- program instructions to execute, using the execution core, the first container, the executing virtualizing an operating system executing on the computer system;
- program instructions to determine a first simultaneous multithreading (SMT) parameter, wherein the first SMT parameter specifies the number of threads per core for the container initialization procedure;
- program instructions to configure, as sharable, the execution core, to form a sharable execution core; and
- program instructions to execute, using the sharable execution core, a second container, the second container having a second SMT parameter equal to the first SMT parameter.

15. The computer system of claim 14, further comprising:
- program instructions to determine, from a container preference setting, the first SMT parameter.

16. The computer system of claim 14, wherein program instructions to configure comprise program instructions to disable, to achieve the number of threads per core, a thread in the execution core.

17. The computer system of claim 14, wherein a first container core parameter specifies a number of execution cores to be selected from the set of available cores.

18. The computer-implemented method of claim 2, wherein the container preference setting is a requirement.

* * * * *